United States Patent Office 3,409,251
Patented Nov. 5, 1968

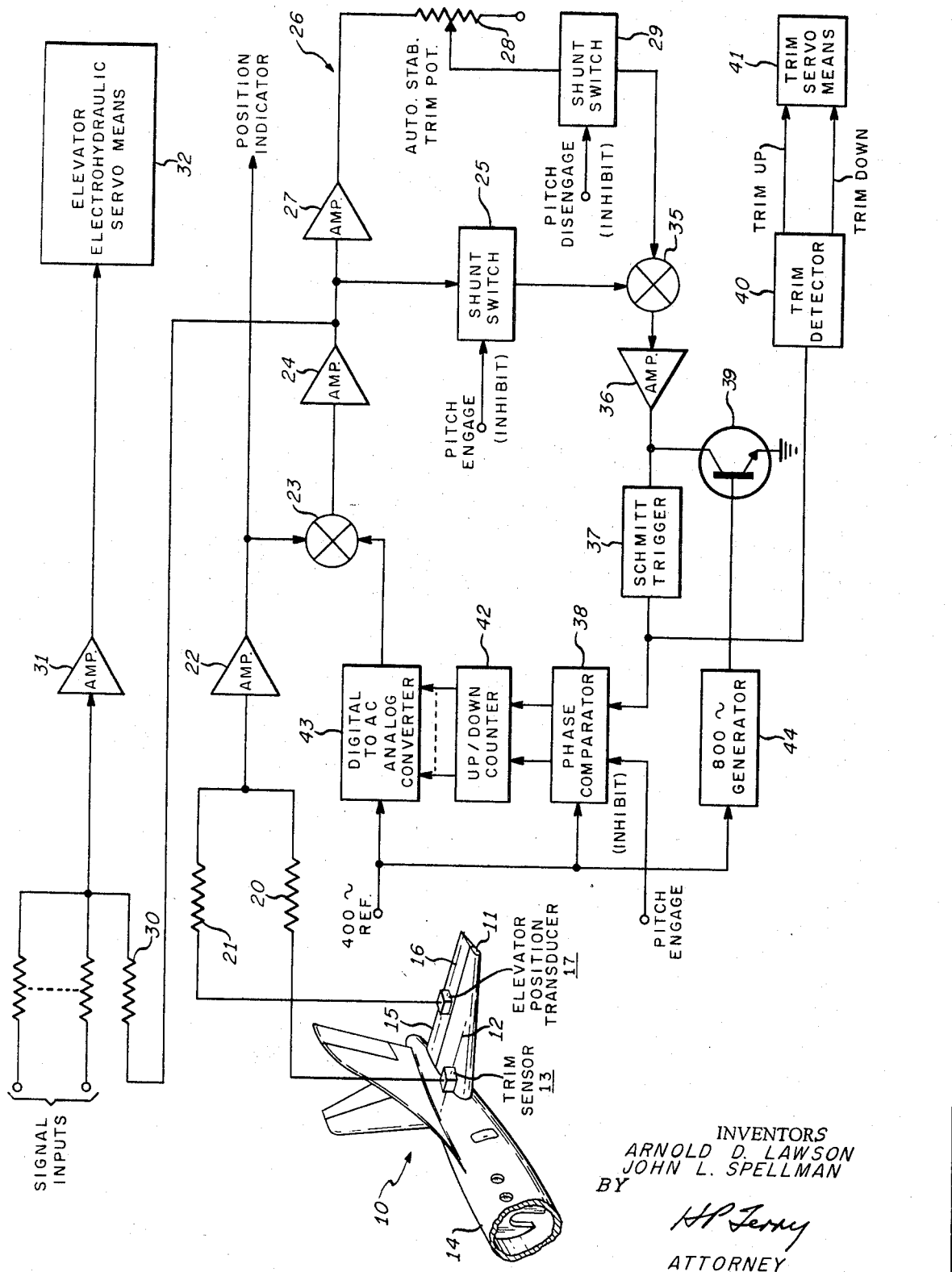

3,409,251
SERVO MEANS HAVING COMPENSATION
FOR UNDESIRABLE SIGNALS
Arnold D. Lawson, San Jose, Calif., and John L. Spellman, Phoenix, Ariz., assignors to Sperry Rand Corporation, a corporation of Delaware
Filed Dec. 1, 1966, Ser. No. 598,285
7 Claims. (Cl. 244—77)

ABSTRACT OF THE DISCLOSURE

A servo loop having one mode of operation for sensing the misalignment signal from a misaligned pick-off, storing the misalignment signal and providing a compensating signal thereby rendering only the desirable operating signals effective. In another mode of operation, long-term signals are selectively rendered effective utilizing common components of the aforementioned servo loop to provide long-term control.

---

The present invention relates to servo means having compensation for undesirable signals and has particular application to digital servo loops having a synchronization capability.

The present invention is particularly useful for synchronizing and controlling the attitude control surfaces of aircraft. Aircraft attitude control surfaces normally have transducer pick-offs which operate from a sinusoidal voltage source generated on the aircraft. In the prior art, the transducer pick-offs associated with attitude control surfaces are normally installed very carefully in order that the electrical null of the transducer pick-off very accurately coincides with the neutral position of the control surface. The transducer pick-off then normally provides a sinusoidal output voltage of zero amplitude when the aircraft control surface to be controlled by an associated servo system is in its neutral or streamline position. As the control surface is displaced from its streamline position, the amplitude of he transducer pick-off signal increases in-phase or out-of-phase with respect to the aircraft power supply reference as the movable portion of the transducer element is displaced up or down from its neutral or electrical null position. Phase sensitive electro-mechanical servo systems are responsive to the signal for controlling the flight of the aircraft. The prior art servo systems generally utilize synchro or resolver devices as well as electrical motors for direct control and electro-mechanical integrating devices for integral control.

Prior art servo systems for aircraft flight control normally utilize electromechanical integrators for long-term trim control. In the prior art pitch control configurations, a movable trim tab is mounted on a movable elevator which in turn is mounted on a horizontal stabilizer that is fixed with respect to the aircraft. In certain modern aircraft, the trim tab is omitted and a movable elevator surface is mounted on a stabilator which performs the dual function of a horizontal stabilizer and trim tab. The present invention provides for trim adjustment without the necessity of utilizing an electromechanical integrator and is adapted for use with either a conventional trim tab or the aforementioned stabilator.

The prior art devices suffer from several disadvantages; one of which is the difficulty of accurately aligning the transducer pick-offs to provide an accurate electrical null when the control surface is in its neutral position. In certain modern aircraft, accurate alignment of the transducer pick-off is not only extremely difficult and time consuming but virtually impossible due to the location or configuration of the transducer pick-offs and the type of aircraft control surfaces utilized. Furthermore, the prior art servo systems employing synchros, resolvers and motors are also subject to alignment problems and tend to lose their alignment with use. They also tend to change characteristics with age thereby causing deterioration of the over-all system accuracy. In addition, the synchros, resolvers and electrical motors utilized in prior art systems are relatively cumbersome and unduly heavy particularly for aircraft application.

It is therefore an object of the present invention to provide a digital servo system adapted to operate in response to transducer pick-off voltages.

It is another object of the present invention to provide a digital servo system responsive to analog transducer type signals.

It is a further object of the present invention to provide servo means having compensation for misalignment of transducer pick-offs.

It is another object of the present invention to provide a multiple loop servo system for providing compensation for undesirable signals due to misalignment in one mode and in another mode to provide control signals.

The above objects are accomplished by utilizing a digital servo loop adapted to operate from aircraft transducer type voltages. In one mode of operation a digital follow-up servoloop senses the misalignment signal from the misaligned transducer pick-off, stores a signal representative of the magnitude and sense of the misalignment, and provides a compensating analog signal equal in magnitude and opposite in sense with respect to the misalignment signal for effectively cancelling the misalignment signal, thereby rendering only the desirable operating signals effective. In another mode of operation, long-term signals are selectively rendered effective utilizing common components of the digital servo loop described above to provide trim control signals. The digital servo system comprises multiple paths utilizing compact, reliable and lightweight digital components.

These and other objects of the present invention will become apparent by referring to the drawing which is an electrical schematic wiring diagram of a digital servo system incorporating pitch surface synchronization and trim signal generation in accordance with the present invention.

The present invention will be described with respect to an aircraft flight control system for controlling the attitude of an aircraft in pitch, for purposes of example, as it will be appreciated that the present invention is also applicable for solving similar problems in other types of systems.

Referring now to the drawing, an aircraft 10 has a stabilator 11 mounted for rotation about an axis 12 of the aircraft. The stabilator 11 provides the dual function of the conventional fixed horizontal stabilizer and conventional trim tab. Trim transducer pick-off 13 is mounted to provide a sinusoidal pick-off signal having an amplitude and phase representative of the magnitude and sense of the displacement of the stabilator 11 with respect to aircraft fuselage 14. An elevator 15 is in turn movably mounted on the stabilator 11 for rotation about an axis 16. An elevator position transducer pick-off 17 is mounted to provide a sinusoidal pick-off signal having an amplitude and phase representative of the magnitude and sense of the displacement of the elevator 15 with respect to its deviation from a streamline condition with respect to the stabilator 11.

Alignment of the elevator position transducer pick-off 17 to provide an electrical null when the elevator 15 is in its streamline position is exceptionally difficult and virtually impossible in certain instances, for example, where the pick-off 17 is an integral part of the hydraulic actuator that positions the elevator 15 and thus the necessity for the present invention. The trim transducer pick-off 13 is more readily accessible for electrical nulling and may be so nulled if desired. However, as will be explained, it is not necessary to do so since the present invention will also compensate for any misalignment of the pick-off 13 as well as the pick-off 17, in a manner to be described.

The pick-offs 13 and 17 are connected through respective summing resistors 20 and 21 to an amplifier 22. The output of the amplifier 22 is connected to an input terminal of a comparison means in the form of an algebraic summation device 23. The output of the amplifier 22 may also be connected to a position indicator to provide a visual indication of the relative position of the elevator 15. The output terminal of the algebraic summation device 23 is connected to an amplifier 24 which in turn is connected to a shunt switch 25 which defines the operative loop of the over-all servo system 26 during the pitch disengage mode. The output of the amplifier 24 is also connected through another amplifier 27 to an automatic stabilization trim potentiometer 28 which has its wiper output connected to a shunt switch 29. The amplifier 27, potentiometer 28 and shunt switch 29 to define a parallel operative loop of the servo system 26 which is rendered effective during the pitch engage mode. The output of the amplifier 24 is also connected in feedback fashion through a summing resistor 30 to an amplifier 31. The other inputs to the amplifier 31 represent the normal control signal inputs for pitch control of the aircraft, such as pitch command signals, vertical gyro signals from the pitch pick-off, etc., which are connected through respective summing resistors to the input of the amplifier 31. The output of the amplifier 31 is connected to actuate the actuator valve of the aircraft electrohydraulic servo means 32.

The outputs of the shunt switches 25 and 29 are connected to the respective input terminals of an algebraic summation device 35 which has its output terminal connected to an amplifier 36. The output of the amplifier 36 is connected to a Schmitt trigger 37 and to the collector of a transistor 39 which has its emitter coupled to ground potential. The Schmitt trigger 37 is connected to a phase comparator 38 and also to a trim sensor 40. The trim detector 40 provides trim up and trim down signals, in a manner to be more fully described, which actuate the trim electrohydraulic servo means 41 for positioning the stabilizer 11. The phase comparator 38 provides binary up and down signals to an up-down counter or storage register 42 which in turn is connected to a digital-to-A.C. analog converter 43, that in turn has its output connected to another input terminal of the algebraic summation device 23. The converter 43, phase comparator 38 and an 800 cycle generator 44 are responsive to the aircraft 400 cycle reference frequency. The 800 cycle generator 44 is connected to the base of the transistor 39. Pitch engage mode signals are connected to the phase comparator 38 and the shunt switch 25 while pitch disengage mode signals are connected to the shunt switch 29.

In operation, during the pitch disengage mode, it is desirable to compensate for the undesirable signals due to misalignment of the pick-offs 13 and/or 17 emanating therefrom. Thus, in the pitch disengage mode an inhibit signal is provided to the shunt switch 29 which prevents signals from passing therethrough. The misalignment signals are thus connected through the amplifier 22, the algebraic summation device 23, the amplifier 24 and the shunt switch 25, the latter being energized to permit signals to pass therethrough. The misalignment signals from the pick-offs 13 and/or 17 are sinusoidal and have an amplitude and phase representative of the magnitude and sense of the misalignment of the pick-offs with respect to the streamline condition of the control surfaces. These signals are at a 400 cycle repetition rate and are applied through the switch 25 via the algebraic summation device 35 to the amplifier 36.

The Schmitt trigger 37 emits pulses referred to either the 90° or 270° phase reference points which are compared with the 400 reference cycle in the phase comparator 38 to provide binary up signal pulses with respect to the 90° phase reference pulses and binary down pulses with respect to the 270° phase reference pulses. The 800 cycle generator 44 generates a waveform which saturates the transistor 39 thereby bypassing of the output of the amplifier 36 except for short periods of time at 90° and 270° positions of the reference 400 cycle waveform. The brief off periods of the transistor 39 allow a sample portion of the output of the amplifier 36 to appear at the input of the Schmitt trigger 37. The Schmitt trigger 37 generates a pulse output during the positive half cycle of the output signal from the amplifier 36 greater than a predetermined voltage, e.g., 30 millivolts. The output pulse of the Schmitt trigger 37 is compared to the instantaneous polarity of the 400 cycle reference voltage in the phase comparator 38. An Add pulse or Subtract pulse representative of up or down movement of the control surface is transmitted by the phase comparator 38 to the up-down counter 42. Up pulses, for example, are those appearing at 90° while down pulses are those appearing at 270°. The up or down pulses from the phase comparator 38 are transmitted to the up-down counter 42 so as to decrease the error output voltage from the amplifier 24.

The up-down counter 42 counts up or down according to the trim up or trim down input signals and provides an output to the digital-to-A.C. analog converter 43 which in turn provides an A.C. analog voltage having an amplitude equal to that of the misalignment signal and of opposite phase to thereby reduce the error signal from the amplifier 24 to zero. The signal representative of the magnitude and sense of the misalignment is then stored in the up-down counter 42 such that the converter 43 continuously provides a compensating signal to provide a zero error signal from the amplifier 24 during the pitch disengage mode.

Each cycle of the error output of the amplifier 24 is sampled. Therefore, a pulse rate of 400 pulses per second is applied to the up-down counter 42 as long as the error output is greater than 30 millivolts. Utilizing an eight-stage up-down counter 42, the maximum storage of the binary register 42 is 256 bits and thus the maximum time required for synchronization in the pitch disengage mode is 0.64 second.

Preferably, the reference voltage applied to the digital-to-A.C. analog converter 43 is a 400 cycle signal obtained for example by a step-down transformer (not shown) from the 115 volt 400 cycle aircraft power supply line. With the input signal transducer pick-off excitation also obtained from the aforementioned 115 volt line, any change in the voltage of the 400 cycle line will cause an equal change in gradient in both the output of the converter 43 and the output of the transducers 13 and 17. Thus, the synchronized condition does not vary with a variation in line voltage and the up-down counter 42 maintains an accurate permanent memory capability of the misalignment signal.

When it is desired to engage the pitch channel to perform pitch maneuvers by means of the automatic pilot, the pitch engage mode is selected by the pilot which actuates switching means (not shown) to provide inhibit signals to the phase comparator 38 and the shunt switch 25 and removes the pitch disengage signal from the shunt switch 29. This prevents any additional signals from being transmitted through the phase comparator 38 to the up-down counter 42 and thus the up-down counter 42 maintains the stored signal representative of the magnitude and sense of the misalignment of the transducers 13 and 17 and the converter 43 continuously provides a compensating signal to null the misalignment signal in the algebraic summation device 23 thereby permitting only the desired signals representative of the relative movement to be effective in the pitch engage mode.

In the pitch engage mode the shunt switch 25 is inhibited from passing signals while the shunt switch 29 is permitted to pass signals. In the pitch engage mode, the changes in the outputs of the transducer pick-offs 13 and 17 are rendered effective through the amplifier 27, potentiometer 28 and the shunt switch 29, and in feedback fashion through the summing resistor 30 and amplifier 31. The gain through the amplifier 27 and the automatic stabilization trim potentiometer 28 is substantially less than through the shunt switch 25. For example, in one application it is less than unity being approximately 0.25 which in effect reduces the sensitivity of the Schmitt trigger 37 to the signals emanating from the amplifier 24. A threshold is thereby established determined by the gains of the amplifiers 27 and 36 and the setting of the potentiometer 28 which will permit the Schmitt trigger 37 to emit pulses only above the threshold established thereby. The pulses from the Schmitt trigger 37 as before are at a 400 cycle repetition rate and occur at either 90° or 270° with respect to the reference voltage depending upon the phase of the output signal from the amplifier 24 which is representative of the sense of the displacement of the control surface involved.

The trim detector 40 is responsive to the pulses from the Schmitt trigger 37 and detects the position of the pulses to deliver either a trim up or trim down signal to the stabilator electrohydraulic servo means 41 which drives the control surface at a constant rate until the error signal is nulled and then it remains at that new stable position. If desired, an additional time delay to establish a wider dead zone than that provided by the trim potentiometer 28 can be achieved by utilizing time delay circuits in the trim detector 40, for example, of the R–C integrating type.

Preferably, the trim threshold established by the potentiometer 28 which may also be combined with the time delay in the trim detector 40 must be exceeded for a specified period before trim is commanded by trim up and trim down signals from the trim detector 40. A typical threshold might be for example 0.6 second which would effectively eliminate undesirable trim activity associated with gust transients. The time delay function associated with said trim detector 40 is sufficiently long with respect to the synchronization time during the pitch disengage mode to prevent any trim up or trim down signals from emanating from the detector 40 during synchronization.

What is claimed is:
1. Servo means having compensation for undesirable signals due to misalignment comprising
 (a) transducer pick-off means adapted to be coupled to relatively movable objects for providing desirable signals representative of the relative movement therebetween during normal operation but also providing undesirable signals due to misalignment of said transducer means with respect to said objects, said transducer pick-off means providing sinusoidal signals having an amplitude and phase representative of the magnitude and sense of said relative movement and said misalignment,
 (b) pulse generating means responsive to said undesirable signals for providing pulse signals representative of the magnitude and sense of said misalignment,
 (c) storage register means responsive to said pulse signals for storing a signal representative of said magnitude and sense of said misalignment and for providing an output representative of said stored signal,
 (d) digital-to-analog signal conversion means coupled to said storage register means for providing analog compensating signals equal in magnitude and opposite in sense with respect to said undesirable signals, and
 (e) means including comparison means coupled to said transducer pick-off means and said conversion means for effectively cancelling said undesirable signals by means of said compensating signals whereby only said desirable signals are rendered effective.

2. Servo means of the character recited in claim 1 and further including another parallel servo loop having substantially lower gain therethrough, switching means for selectively controlling the effective high or low gain loop and means for selectively rendering said switching means effective.

3. Servo means of the character recited in claim 2 and further including means for clamping said stored signal and simultaneously rendering said low gain loop effective, and means coupled in said low gain loop for rendering said pulse signals effective in excess of a predetermined threshold.

4. Servo means of the character recited in claim 3 and further including pulse detector means responsive to said pulse signals for providing output signals representative of the number and position of said pulse signals in excess of said threshold.

5. Servo means of the character recited in claim 4 in which said pulse detector means includes time delay means for rendering said pulse signals in excess of said threshold ineffective for a predetermined time delay.

6. Servo means of the character recited in claim 5 in which said transducer pick-off means includes elevator position tranducer means and trim transducer pick-off means adapted to be coupled to the elevator and effective trim surface respectively of an aircraft for providing desirable signals representative of the relative movement therebetween during normal operation but also providing undesirable signals due to misalignment, and said pulse detecting means provides up or down trim signals in accordance with said desirable signals in excess of said threshold when said time delay is exceeded.

7. Servo means of the character recited in claim 6 in which said storage register means includes phase comparison means responsive to said pulse signals for providing up-down binary counting signals representative of the number and phase relation of said pulse signals, and binary counting means responsive to said up-down binary counting signals for providing said output in accordance therewith representative of said stored signal.

References Cited

UNITED STATES PATENTS 3,077,773    2/1963    Gardner et al.    244—77 X
3,218,532    11/1965    Toscano    318—20.320

FERGUS S. MIDDLETON, *Primary Examiner.*